United States Patent
Park et al.

(10) Patent No.: US 10,725,525 B2
(45) Date of Patent: Jul. 28, 2020

(54) METHOD OF OPERATING SYSTEM-ON-CHIP, SYSTEM-ON-CHIP PERFORMING THE SAME AND ELECTRONIC SYSTEM INCLUDING THE SAME

(71) Applicant: SAMSUNG ELECTRONICS CO., LTD., Suwon-si (KR)

(72) Inventors: Jong-Lae Park, Anyang-si (KR); Seok-Ju Yoon, Yongin-si (KR); Young-Tae Lee, Seoul (KR); Lak-Kyung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 15/838,613

(22) Filed: Dec. 12, 2017

(65) Prior Publication Data
US 2018/0188789 A1    Jul. 5, 2018

(30) Foreign Application Priority Data
Dec. 30, 2016    (KR) .................. 10-2016-0183423

(51) Int. Cl.
| | |
|---|---|
| *G06F 1/32* | (2019.01) |
| *G06F 1/26* | (2006.01) |
| *G06F 1/324* | (2019.01) |
| *G06F 15/78* | (2006.01) |
| *G06F 13/24* | (2006.01) |
| *G06F 1/3296* | (2019.01) |

(52) U.S. Cl.
CPC ............ *G06F 1/324* (2013.01); *G06F 1/3296* (2013.01); *G06F 13/24* (2013.01); *G06F 15/7807* (2013.01); *Y02D 10/14* (2018.01)

(58) Field of Classification Search
CPC ................................. G06F 1/26; G06F 1/32
See application file for complete search history.

(56) References Cited

U.S. PATENT DOCUMENTS

| | | | |
|---|---|---|---|
| 7,861,098 B2 | 12/2010 | Theocharous et al. | |
| 8,996,595 B2 | 3/2015 | Gargash et al. | |
| 9,021,281 B2 | 4/2015 | Alapati et al. | |
| 9,152,214 B2 | 10/2015 | Thumma | |
| 9,285,858 B2 | 3/2016 | Klassen et al. | |
| 9,915,996 B2* | 3/2018 | Noro | G06F 1/3228 |
| 10,296,067 B2* | 5/2019 | Park | G06F 1/329 |
| 2009/0204830 A1* | 8/2009 | Frid | G06F 1/3203 713/322 |
| 2010/0023653 A1* | 1/2010 | Rozen | G06F 13/1605 710/28 |
| 2013/0074085 A1* | 3/2013 | Thomson | G06F 1/3203 718/102 |
| 2013/0262894 A1 | 10/2013 | Lee et al. | |

(Continued)

*Primary Examiner* — Phil K Nguyen
(74) *Attorney, Agent, or Firm* — Sughrue Mion, PLLC

(57) ABSTRACT

A method of operating a system-on-chip (SOC) including a central processing unit (CPU) and a target hardware to which a dynamic voltage and frequency scaling (DVFS) is applied, includes determining an operating scheme of the target hardware, setting a DVFS application scheme for applying the DVFS to the target hardware, based on the operating scheme of the target hardware, and performing the DVFS on the target hardware, based on the DVFS application scheme.

16 Claims, 17 Drawing Sheets

(56) References Cited

U.S. PATENT DOCUMENTS

| | | | | |
|---|---|---|---|---|
| 2013/0326527 | A1* | 12/2013 | Suzuki | G06F 9/4881 |
| | | | | 718/102 |
| 2014/0063026 | A1* | 3/2014 | Oh | G06T 1/20 |
| | | | | 345/519 |
| 2014/0068285 | A1* | 3/2014 | Lee | G06F 1/324 |
| | | | | 713/300 |
| 2014/0068290 | A1* | 3/2014 | Bhandaru | G06F 1/3296 |
| | | | | 713/320 |
| 2014/0089699 | A1* | 3/2014 | O'Connor | G06F 1/324 |
| | | | | 713/322 |
| 2014/0184619 | A1* | 7/2014 | Kim | G06T 1/20 |
| | | | | 345/519 |
| 2015/0277534 | A1 | 10/2015 | Park et al. | |
| 2016/0154449 | A1 | 6/2016 | Lim et al. | |

* cited by examiner

METHOD OF OPERATING SYSTEM-ON-CHIP, SYSTEM-ON-CHIP PERFORMING THE SAME AND ELECTRONIC SYSTEM INCLUDING THE SAME

CROSS-REFERENCE TO THE RELATED APPLICATION

This application claims priority from Korean Patent Application No. 10-2016-0183423, filed on Dec. 30, 2016, in the Korean Intellectual Property Office (KIPO), the disclosure of which is incorporated herein by reference in its entirety.

BACKGROUND

1. Field

Apparatuses and methods consistent with example embodiments relate to power management, and more particularly to methods of operating system-on-chips, system-on-chips performing the methods and electronic systems including the system-on-chips.

2. Description of the Related Art

A system-on-chip (SOC) refers to a processing system that integrates various functional blocks (e.g., a central processing unit, a memory, an interface unit, a digital signal processing unit, an analog signal processing unit, etc.) in a single, or a few, semiconductor integrated circuits (ICs) to implement an electronic system, such as a computer system, using a limited number of ICs. Dynamic voltage and frequency scaling (DVFS) has been employed in the SOC to reduce power consumption. The DVFS represents a technology that dynamically controls or adjusts an operating frequency and an operating voltage.

SUMMARY

According to example embodiments, there is provided a method of operating a system-on-chip (SOC) including a central processing unit (CPU) and a target hardware to which a dynamic voltage and frequency scaling (DVFS) is applied. The method includes determining an operating scheme of the target hardware, setting a DVFS application scheme for applying the DVFS to the target hardware, based on the operating scheme of the target hardware, and performing the DVFS on the target hardware, based on the DVFS application scheme.

According to example embodiments, there is provided a system-on-chip (SOC) including a target hardware to which a dynamic voltage and frequency scaling (DVFS) is applied, and a DVFS controller configured to determine an operating scheme of the target hardware, set a DVFS application scheme for applying the DVFS to the target hardware, based on the operating scheme of the target hardware, and generate a first control signal and a second control signal that are used to perform the DVFS on the target hardware, based on the DVFS application scheme. The SOC further includes a central processing unit (CPU) configured to control the target hardware and the DVFS controller, and a clock management unit (CMU) configured to generate a clock signal, based on the first control signal, and provide the clock signal to the target hardware.

According to example embodiments, there is provided an electronic system including a system-on-chip (SOC), a power management integrated circuit (PMIC) configured to provide a power supply signal to the SOC, and a trigger signal associated with a dynamic voltage and frequency scaling (DVFS) that is performed by the SOC. The SOC includes a target hardware to which the DVFS is applied, and a DVFS controller configured to determine an operating scheme of the target hardware, set a DVFS application scheme for applying the DVFS to the target hardware, based on the operating scheme of the target hardware, and generate a first control signal and a second control signal that are used to perform the DVFS on the target hardware, based on the DVFS application scheme. The SOC further includes a central processing unit (CPU) configured to control the target hardware and the DVFS controller, and a clock management unit (CMU) configured to generate a clock signal, based on the first control signal, and provide the clock signal to the target hardware.

According to example embodiments, there is provided a system-on-chip (SOC) including a target hardware to which a dynamic voltage and frequency scaling (DVFS) is applied, and a DVFS controller configured to detect a trigger signal representing whether a target event is to be performed by the target hardware, in response to the trigger signal being activated, set a cycle of a monitoring operation for the target hardware to one of first cycles, and set a starting point of the monitoring operation to be substantially equal to a starting point at which the trigger signal is activated, and generate a control signal that is used to perform the monitoring operation, based on the cycle and the starting point of the monitoring operation. The SOC further includes a clock management unit (CMU) configured to generate a clock signal, based on the control signal, and provide the clock signal to the target hardware.

DETAILED DESCRIPTION OF THE EXAMPLE EMBODIMENTS

Figure 1:
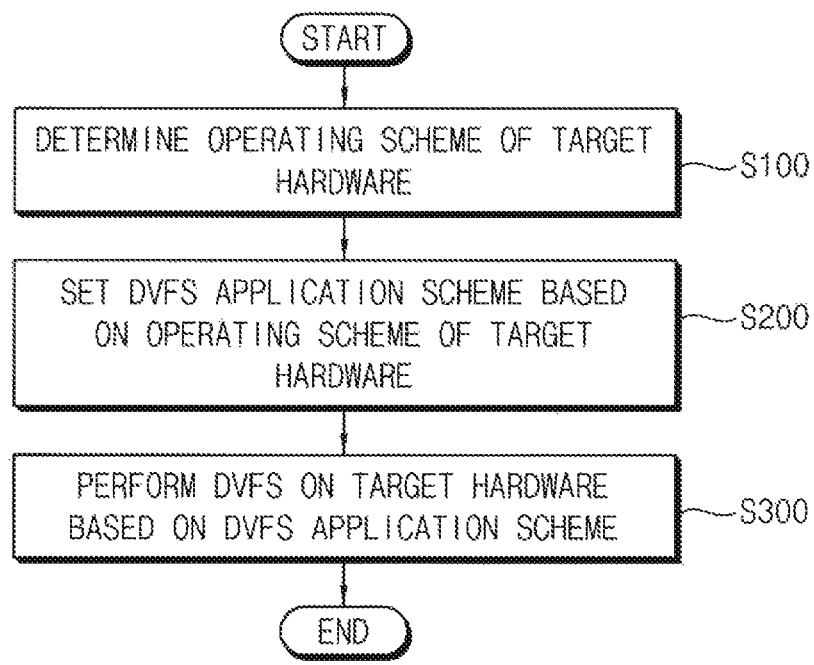
FIG. 1 is a flow chart illustrating a method of operating a system-on-chip (SOC), according to example embodiments.

FIG. 1 is a flow chart illustrating a method of operating a system-on-chip (SOC), according to example embodiments.

Referring to FIG. 1, in a method of operating a SOC according to example embodiments, an operating scheme of a target hardware is determined (step S100). The SOC includes a central processing unit (CPU) and the target hardware to which a dynamic voltage and frequency scaling (DVFS) is applied. The target hardware may be a non-CPU intellectual property (IP) other than the CPU. In other words, the DVFS to be described in the example embodiments may be executed on the non-CPU IP. The non-CPU IP may represent an IP not having a CPU, and the IP may be a hardware module having custom design features and/or functions. A configuration of the SOC will be described with reference to FIG. 2.

A DVFS application scheme used for applying the DVFS to the target hardware is set based on the operating scheme of the target hardware (step S200). The DVFS is performed on the target hardware, based on the DVFS application scheme (step S300). Hereinafter, the method of operating the SOC according to example embodiments will be described based on an example in which the DVFS is applied to, performed on or executed on the non-CPU IP.

In example embodiments, the operating scheme of the target hardware may include a first unit operation used for a first target event performed by the target hardware, and the DVFS application scheme may include a starting point of a monitoring operation for the target hardware. In this example, as will be described with reference to FIGS. 2 through 5, the DVFS application scheme may be set by matching the starting point of the monitoring operation for the target hardware with a starting point of the first unit operation.

In other example embodiments, the operating scheme of the target hardware may include a second unit operation used for a second target event performed by the target hardware. The second target event and the second unit operation may be different from the first target event and the first unit operation, respectively. In this example, as will be described with reference to FIGS. 6 through 9, the DVFS application scheme may be set by matching the starting point of the monitoring operation for the target hardware with a starting point of the second unit operation.

In still other example embodiments, the operating scheme of the target hardware may include both the first and second unit operations. In this example, as will be described with reference to FIGS. 10 through 12, the DVFS application scheme may be set by matching the starting point of the monitoring operation for the target hardware with a starting point of one of the first and second unit operations, based on a priority of the first and second target events. Alternatively, as will be described with reference to FIGS. 13 and 14, the operating scheme of the target hardware may include more than three unit operations.

A DVFS has been periodically performed or executed on a CPU, based on a predetermined and fixed cycle or only when the CPU normally operates. Similarly, the DVFS may be periodically performed or executed on a non-CPU IP. In an example of a CPU-bound job (e.g., a core-bound job or a computing-bound job), the DVFS efficiency may not be degraded even if the DVFS is periodically performed or executed on the non-CPU IP. However, in an example of a memory-bound job, the DVFS efficiency may be degraded when the DVFS is periodically performed or executed on the non-CPU IP.

In the method of operating the SOC according to example embodiments, an optimized DVFS application scheme may be set based on the operating scheme of the target hardware, that is the non-CPU IP, and the DVFS may be performed or executed on the target hardware, based on the optimized DVFS application scheme. For example, the starting point of the monitoring operation for the target hardware may be dynamically controlled or adjusted, and thus a cycle of the monitoring operation and a cycle of the DVFS may be controlled or adjusted. Accordingly, unnecessary power consumption in the SOC may be reduced, and the SOC may have relatively improved power efficiency and improved performance.

Figure 2:
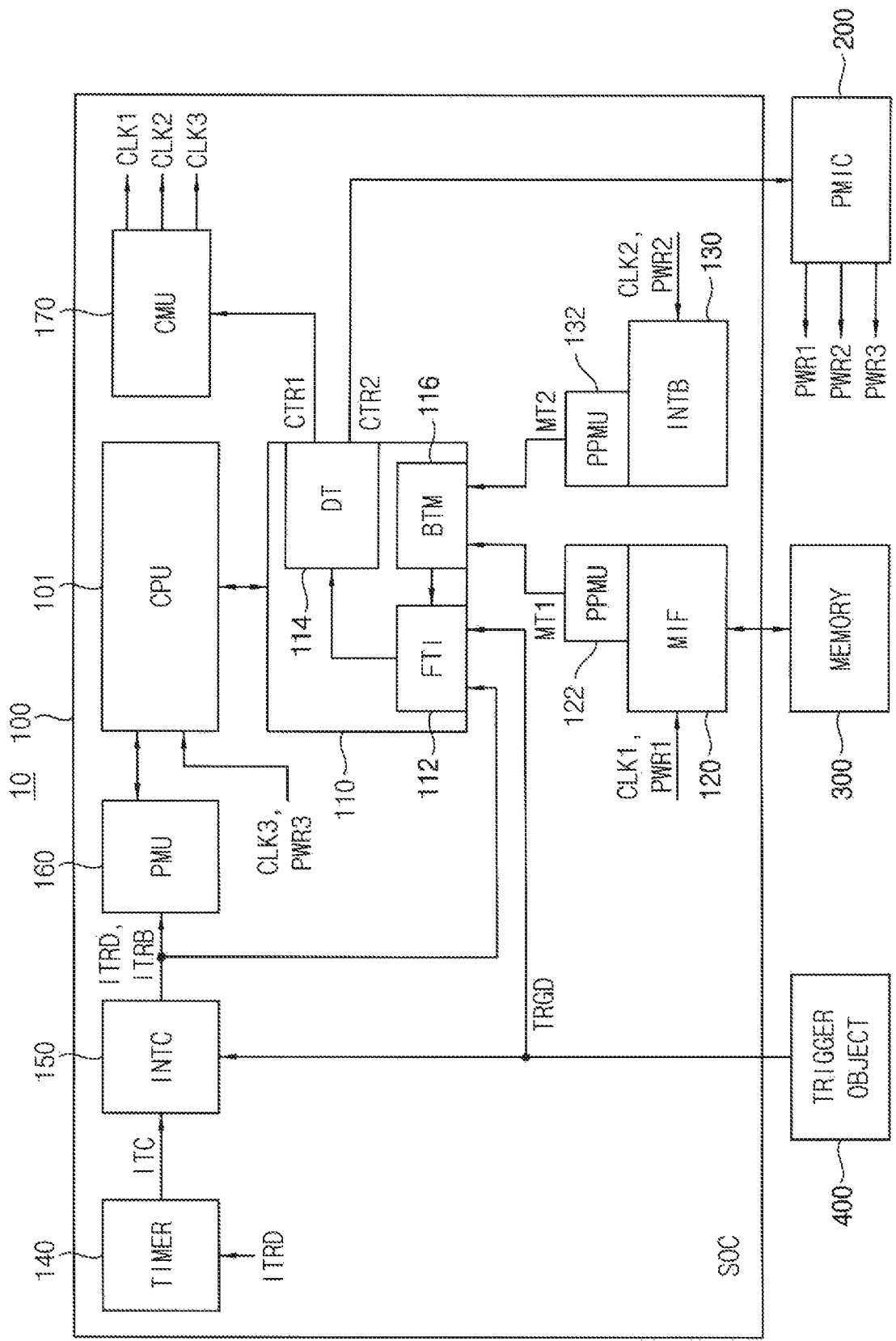
FIG. 2 is a block diagram illustrating an electronic system including a SOC, according to example embodiments.

FIG. 2 is a block diagram illustrating an electronic system including a SOC, according to example embodiments.

Referring to FIG. 2, an electronic system 10 includes a SOC 100, a power management integrated circuit (PMIC) 200, a memory device 300 and a trigger object 400.

In example embodiments, the electronic system 10 may be any computing device or any mobile/portable device, such as a mobile phone, a smart phone, a tablet computer, a laptop computer, a personal digital assistants (PDA), a portable multimedia player (PMP), a digital camera, a portable game console, a music player, a camcorder, a video player, a navigation device, a wearable device, an internet of things (IoT) device, an internet of everything (IoE) device, an e-book, a virtual reality (VR) device, an augmented reality (AR) device, a robotic device, etc.

The SOC 100 includes a CPU 101, a DVFS controller 110, a memory interface (MIF) 120, an internal logic 130 with a bus (INTB), and a clock management unit (CMU) 170. The SOC 100 may further include a first performance monitoring unit (PPMU) 122, a second PPMU 132, a timer 140, an interrupt controller (INTC) 150 and a power management unit (PMU) 160.

In example embodiments, the SOC 100 may be an application processor (AP), a mobile AP, or the like.

The memory interface 120 controls or facilitates data transfer between the SOC 100 and the memory device 300. The memory interface 120 may operate based on a first clock signal CLK1 and a first power supply signal PWR1. The memory interface 120 may be a target hardware to which the DVFS is applied according to example embodiments. For example, when the DVFS is performed or executed on the memory interface 120, a frequency of the first clock signal CLK1 and a voltage level of the first power supply signal PWR1 may be dynamically controlled or adjusted (e.g., increased, maintained or decreased).

The first PPMU 122 may monitor performance of the memory interface 120. For example, the first PPMU 122 may monitor the frequency of the first clock signal CLK1 provided to the memory interface 120, data traffic ratio of the memory interface 120, and/or usage (or utilization) of the memory interface 120. The first PPMU 122 may generate a first monitoring signal MT1 as a result of the monitoring operation for the memory interface 120. The data traffic ratio may represent a ratio of an actual frequency at which data is transmitted to a reference frequency (e.g., an original frequency) of the first clock signal CLK1. The usage of the memory interface 120 may represent a ratio of a time interval in which the memory interface 120 is actually used to a reference time interval (e.g., a predetermined and fixed time interval).

The internal logic 130 includes the bus and various logic circuits associated with internal data transfer. The internal logic 130 may operate based on a second clock signal CLK2 and a second power supply signal PWR2. The internal logic 130 may be a target hardware to which the DVFS is applied according to example embodiments. For example, when the DVFS is performed or executed on the internal logic 130, a frequency of the second clock signal CLK2 and a voltage level of the second power supply signal PWR2 may be dynamically controlled or adjusted.

The second PPMU 132 may monitor performance of the internal logic 130. For example, the second PPMU 132 may monitor the frequency of the second clock signal CLK2 provided to the internal logic 130, data traffic ratio of the internal logic 130, and/or usage of the internal logic 130. The second PPMU 132 may generate a second monitoring signal MT2 as a result of the monitoring operation for the internal logic 130.

The CPU 101 controls overall operations of the SOC 100. The CPU 101 may control the target hardware such as the memory interface 120, the internal logic 130, etc., may control the DVFS controller 110, and may control various elements included in the SOC 100. The CPU 101 may operate based on a third clock signal CLK3 and a third power supply signal PWR3. In example embodiments, the CPU 101 may include a single processor core or a plurality of processor cores.

The DVFS controller 110 performs the method of operating the SOC according to example embodiments. The DVFS controller 110 determines an operating scheme of the target hardware such as the memory interface 120, the internal logic 130, etc., sets a DVFS application scheme used for applying the DVFS to the target hardware, based on the operating scheme of the target hardware, and generates a first control signal CTR1 and a second control signal CTR2 that are used for performing the DVFS on the target hardware, based on the DVFS application scheme.

The DVFS controller 110 may include a focused target identifier (FTI) 112, a DVFS trigger unit (DT) 114 and a bus traffic monitoring unit (BTM) 116.

The bus traffic monitoring unit 116 may read or receive the first monitoring signal MT1 representing the result of the monitoring operation for the memory interface 120 and the second monitoring signal MT2 representing the result of the monitoring operation for the internal logic 130. Here, each of the first and second PPMUs 122 and 132 may operate as a slave device of the DVFS controller 110, or a slave device of the CPU 101 controlling the DVFS controller 110.

The focused target identifier 112 may determine the operating scheme of the target hardware, based on a trigger signal (e.g., a first trigger signal TRGD) generated by the trigger object 400, or based on an interrupt (e.g., a first interrupt ITRD and/or a second interrupt ITRB) generated by the interrupt controller 150. The operating scheme of the target hardware may be determined additionally based on the results of the monitoring operations for the memory interface 120 and the internal logic 130. In other words, the focused target identifier 112 may detect a focused IP, which is one of non-CPU IPs used to change a DVFS application scheme.

The DVFS trigger unit 114 may set the DVFS application scheme for the target hardware, based on the operating scheme (e.g., state, data traffic ratio and usage of the focused IP) of the target hardware. The DVFS trigger unit 114 may generate the first control signal CTR1 and the second control signal CTR2, based on the DVFS application scheme. In other words, the DVFS trigger unit 114 may control or adjust (e.g., increase, maintain or decrease) a cycle of the monitoring operation and a cycle of the DVFS for the target hardware.

In example embodiments, at least a part of the DVFS controller 110 may be implemented as hardware. For example, the DVFS controller 110 may be a sub-CPU that is dependent on the CPU 101. In other example embodiments, at least a part of the DVFS controller 110 may be implemented as instructions or program routines (e.g., a software program). For example, the instructions or the program routines may be executed by the CPU 101 or a sub-CPU, and may be stored in an internal storage included in the SOC 100 or the memory device 300 located outside the SOC 100.

The CMU 170 generates the first and second clock signals CLK1 and CLK2 for the target hardware based on the first control signal CTR1. For example, the CMU 170 may increase, maintain or decrease the frequency of each of the first and second clock signals CLK1 and CLK2, based on the first control signal CTR1. The CMU 170 may further generate the third clock signal CLK3 for the CPU 101.

The PMIC 200 generates the first and second power supply signals PWR1 and PWR2 for the target hardware, based on the second control signal CTR2. For example, the PMIC 200 may increase, maintain or decrease the voltage level of each of the first and second power supply signals PWR1 and PWR2, based on the second control signal CTR2. The PMIC 200 may further generate the third power supply signal PWR3 for the CPU 101.

The trigger object 400 generates the first trigger signal TRGD associated with the DVFS that is performed by the SOC 100 (e.g., that is performed or executed on the target hardware). For example, the first trigger signal TRGD may represent whether a first target event is to be performed (e.g., whether the target hardware is to be used for the first target event). The first trigger signal TRGD may be activated when the first target event is performed, and the first trigger signal TRGD may be deactivated when the first target event is not performed. For example, the first target event may be a memory-bound job.

In example embodiments, the trigger object 400 may include a user interface controlled by a user such that an operation of performing the first target event is caused by the user interface. For example, the trigger object 400 may include at least one input device such as a keyboard, a keypad, a touch screen, a touch pen, a button, a microphone, an analog stick, and the like. In other example embodiments, the trigger object 400 may be any object such that an operation of performing the first target event is caused by the object.

The interrupt controller 150 may generate an interrupt, based on the first trigger signal TRGD and an interrupt control signal ITC at each scheduled time. For example, the interrupt controller 150 may generate the first interrupt ITRD in each of a plurality of first cycles when the first trigger signal TRGD is activated, and may generate the second interrupt ITRB in each of a plurality of second cycles when the first trigger signal TRGD is deactivated.

The timer 140 may generate the interrupt control signal ITC in each of the plurality of second cycles, and may be initialized in response to the first interrupt ITRD. For example, the timer 140 may be a slack timer. Whenever the first interrupt ITRD is generated, the slack timer may be initialized (e.g., a pending slack is canceled), and then a time counting operation of the slack timer may begin from the first time. If the first interrupt ITRD is not generated during the second cycle, the time counting operation of the slack timer may be finished or completed, and then the interrupt control signal ITC may be generated. The interrupt controller 150 may generate the second interrupt ITRB in response to the interrupt control signal ITC.

The PMU 160 may control a power supply to the CPU 101, based on a control of the interrupt controller 150. For example, the PMU 160 may control the power supply that is able to change the state of the CPU 101 from an idle state to a run state or from the run state to the idle state. For example, the idle state may include a low power mode or a deep power down mode.

The memory device 300 may exchange data with the SOC 100 via the memory interface 120. In example embodiments, the memory device 300 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

Although FIG. 2 illustrates the SOC 100 that includes the memory interface 120 and the internal logic 130 as the target hardware (e.g., the non-CPU IP) for convenience of illustration, the target hardware may further include a graphic processing unit (GPU), an image signal processor (ISP), a display processor, a communication processor, etc., according to example embodiments.

The DVFS may also be applied to, performed on or executed on the CPU 101. Unlike the DVFS for the target hardware (e.g., the non-CPU IP), the DVFS for the CPU 101 may be periodically performed on or executed on, based on a predetermined and fixed cycle. In other words, the DVFS for the target hardware and the DVFS for the CPU 101 may be performed or executed based on different schemes.

Figure 3:
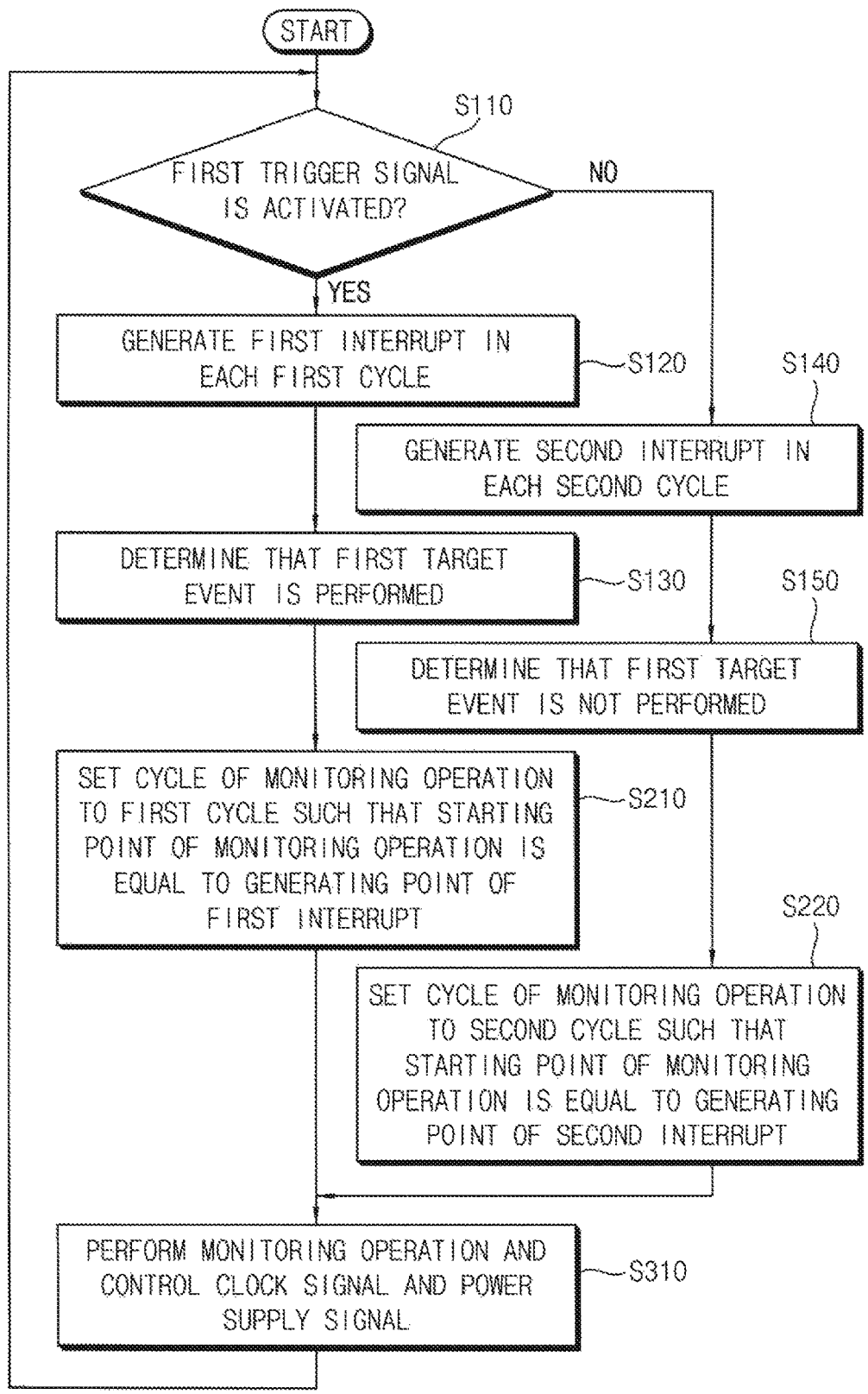
FIG. 3 is a flow chart illustrating a method of operating a SOC, according to example embodiments.
Figure 4:
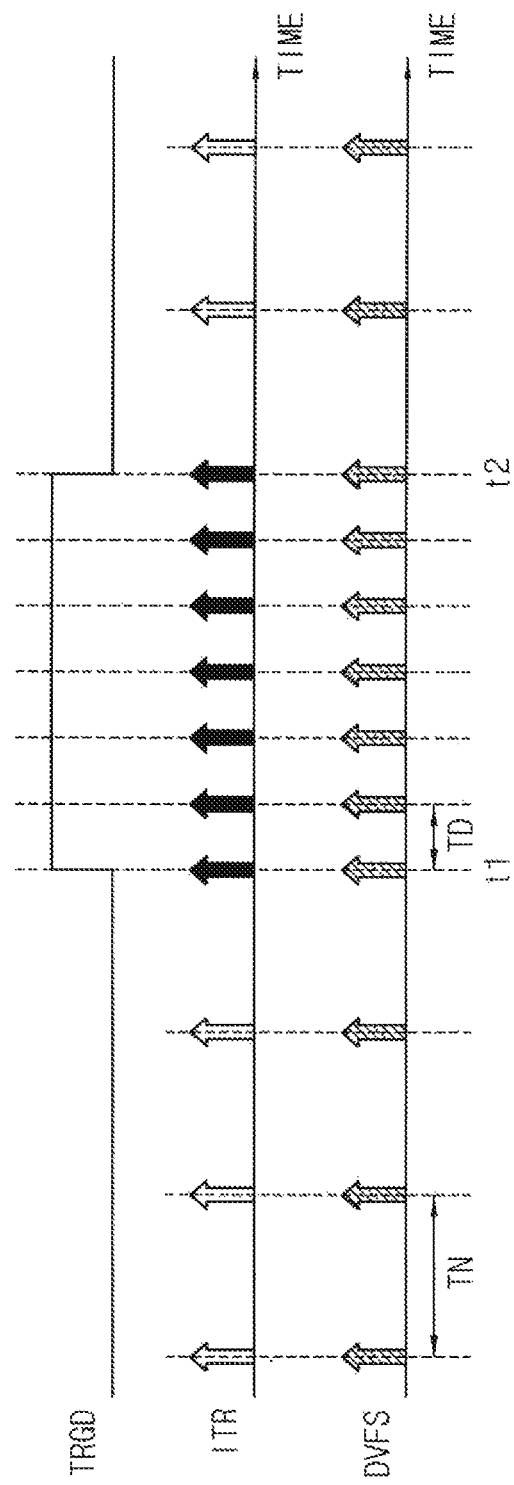
FIGS. 4 and 5 are diagrams for describing the method of operating the SOC of FIG. 3.
Figure 5:
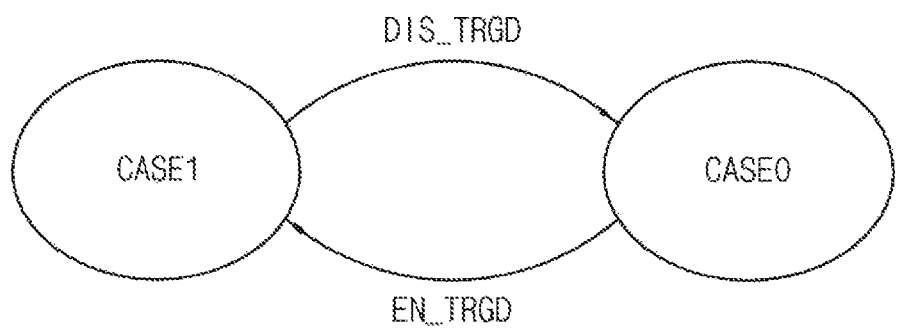

FIG. 3 is a flow chart illustrating a method of operating a SOC, according to example embodiments. FIGS. 4 and 5 are diagrams for describing the method of operating the SOC of FIG. 3.

In FIG. 4, "ITR" represents interrupts (e.g., the first and second interrupts ITRD and ITRB) that are generated by the interrupt controller 150 in FIG. 2. Each of white arrows and each of black arrows on the reference numeral "ITR" represent the second interrupt ITRB and the first interrupt ITRD, respectively. In FIG. 4, "DVFS" represents an operation of performing the DVFS. Each of hatched arrows on the reference numeral "DVFS" represents that the monitoring operation for the target hardware and a control of the clock signal and the power supply signal provided to the target hardware are performed.

Referring to FIGS. 2, 3 and 4, in the method of operating the SOC 100 according to example embodiments, the first trigger signal TRGD representing whether the first target event is to be performed is activated or detected (step S110). For example, the first target event may represent a screen updating operation performed by the electronic system 10 including the SOC 100. For example, the screen updating operation may be performed in response to a VSYNC interrupt, and a first unit operation used for the first target event performed by the target hardware may represent a frame change operation performed in response to the VSYNC interrupt.

When the first trigger signal TRGD is deactivated (step S110: NO), e.g., when the first trigger signal TRGD has a logic low level, the second interrupt ITRB is generated in each second cycle TN (step S140). For example, because the first interrupt ITRD is not generated, the timer 140 may generate the interrupt control signal ITC in each second cycle TN, and thus the interrupt controller 150 may generate the second interrupt ITRB in each second cycle TN in response to the interrupt control signal ITC.

When the first trigger signal TRGD is deactivated (step S110: NO), it is determined, based on the second interrupt ITRB, that the first target event is not performed (step S150). In this case, a cycle of the monitoring operation for the target hardware is set to the second cycle TN such that a starting point of the monitoring operation is substantially equal to a generating point of the second interrupt ITRB (step S220). For example, as illustrated in FIG. 4, the hatched arrows are matched with the white arrows. In other words, locations of the hatched arrows may be substantially equal to locations of the white arrows. For example, steps S150 and S220 may be performed by the DVFS controller 110.

Based on the set cycle (e.g., based on the second cycle TN), the monitoring operation is performed for the target hardware, and the clock signals CLK1 and CLK2 and the power supply signals PWR1 and PWR2 are controlled or adjusted (step S310). For example, the DVFS controller 110 may perform the monitoring operation for each second cycle TN, based on the monitoring signals MT1 and MT2, and may generate the control signals CTR1 and CTR2 for controlling or adjusting the clock signals CLK1 and CLK2 and the power supply signals PWR1 and PWR2. The CMU 170 and the PMIC 200 may control or adjust the clock signals CLK1 and CLK2 and the power supply signals PWR1 and PWR2 in each second cycle TN, based on the control signals CTR1 and CTR2.

In example embodiments, the monitoring operation may represent a scheduling operation at a next time point (e.g., a scheduled time point), and the DVFS may represent a control operation for the clock signals CLK1 and CLK2 and the power supply signals PWR1 and PWR2 at a current time point. For example, the DVFS controller 110 may perform the monitoring operation to schedule the DVFS at a next time point at which the second cycle TN is elapsed from a current time point. The DVFS controller 110 may control or adjust the clock signals CLK1 and CLK2 and the power supply signals PWR1 and PWR2 at a current time point, based on a result of scheduling at a previous time point prior to the current time point by the second cycle TN.

After step S310, step S110 and subsequent steps may be repeated based on the set cycle. For example, the monitoring operation may be performed for each second cycle TN, and the clock signals CLK1 and CLK2 and the power supply signals PWR1 and PWR2 may be controlled or adjusted in each second cycle TN.

At time t1, the first trigger signal TRGD is activated. For example, the SOC 100 may begin to perform the first target event, and then the first trigger signal TRGD may be transitioned from the logic low level to a logic high level.

When the first trigger signal TRGD is activated (step S110: YES), e.g., when the first trigger signal TRGD has the logic high level, the first interrupt ITRD is generated in each first cycle TD (step S120). For example, the first interrupt ITRD may be the VSYNC interrupt. For example, because the first interrupt ITRD is generated, the timer 140 may be initialized in response to the first interrupt ITRD and may not generate the interrupt control signal ITC, and thus the interrupt controller 150 may not generate the second interrupt ITRB but may generate the first interrupt ITRD.

In example embodiments, to implement such operations of the timer 140 and the interrupt controller 150, the second cycle TN may be longer than the first cycle TD, as illustrated in FIG. 4. For example, if a frequency of the first unit operation is about 60 Hz, the first cycle TD may be about 16.67 ms, and the second cycle TN may be about 100 ms.

When the first trigger signal TRGD is activated (step S110: YES), it is determined, based on the first interrupt ITRD, that the first target event is performed (step S130). In other words, it may be determined that the target hardware is used for performing the first target event. In this case, the cycle of the monitoring operation for the target hardware is set to the first cycle TD such that the starting point of the monitoring operation is substantially equal to a generating point of the first interrupt ITRD (step S210). For example, as illustrated in FIG. 4, the hatched arrows are matched with the black arrows. In other words, locations of the hatched arrows may be substantially equal to locations of the black arrows. For example, steps S130 and S210 may be performed by the DVFS controller 110.

Based on the set cycle (e.g., based on the first cycle TD), the monitoring operation is performed for the target hardware, and the clock signals CLK1 and CLK2 and the power supply signals PWR1 and PWR2 are controlled or adjusted (step S310). An operation of step S310 may be substantially the same as an operation described above, except that the cycle of the monitoring operation is changed from the second cycle TN to the first cycle TD.

After step S310, step S110 and subsequent steps may be repeated based on the set cycle. For example, the monitoring operation may be performed for each first cycle TD, and the clock signals CLK1 and CLK2 and the power supply signals PWR1 and PWR2 may be controlled or adjusted in each first cycle TD.

At time t2, the first trigger signal TRGD is deactivated. For example, the first target event may be finished or successfully completed, and then the first trigger signal TRGD may be transitioned from the logic high level to the logic low level. An operation after time t2 may be substantially the same as an operation before time t1.

In example embodiments, steps S110, S120, S130, S140 and S150 may be included in step S100 in FIG. 1, steps S210 and S220 may be included in step S200 in FIG. 1, and step S310 may be included in step S300 in FIG. 1. In example embodiments, the first trigger signal TRGD may be further used in steps S140 and S150. In example embodiments, steps S130 and S150 may be performed by the focused target identifier 112, and steps S210 and S220 may be performed by the DVFS trigger unit 114.

Referring to FIGS. 2 and 5, "CASE1" represents a first state during which the first target event is performed, and "CASE0" represents a second state during which the first target event is not performed. When the first trigger signal TRGD is activated (e.g., EN_TRGD), a state of the SOC 100 is changed from the second state CASE0 to the first state CASE1. When the first trigger signal TRGD is deactivated (e.g., DIS_TRGD), the state of the SOC 100 is changed from the first state CASE1 to the second state CASE0.

Figure 6:
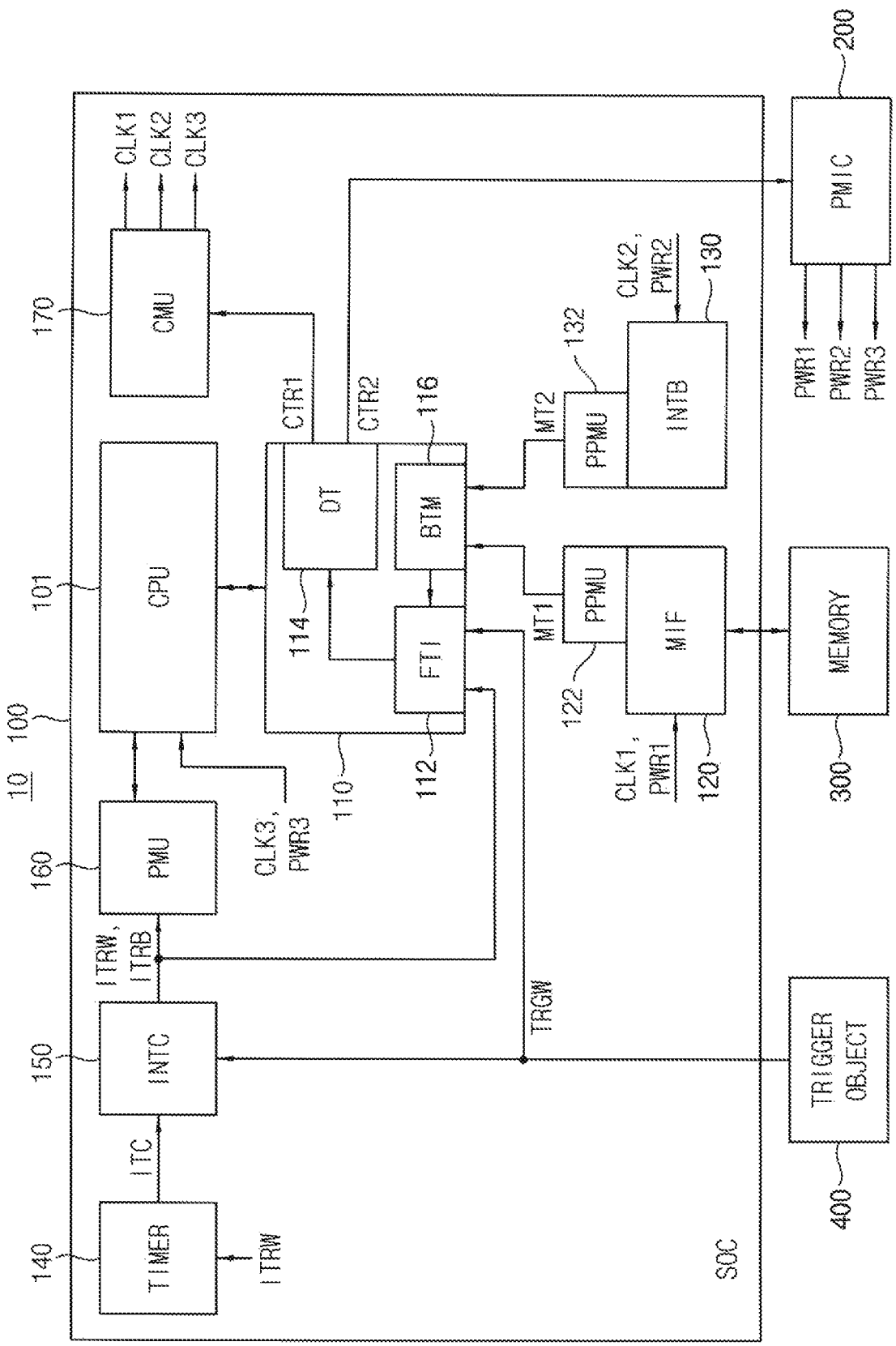
FIG. 6 is a block diagram illustrating an electronic system including a SOC, according to example embodiments.

FIG. 6 is a block diagram illustrating an electronic system including a SOC, according to example embodiments.

Referring to FIG. 6, an electronic system 10 includes a SOC 100, a PMIC 200, a memory device 300 and a trigger object 400. The electronic system 10 in FIG. 6 may be substantially the same as the electronic system 10 in FIG. 2, except that the trigger object 400 in FIG. 6 generates a second trigger signal TRGW instead of the first trigger signal TRGD, and the interrupt controller 150 in FIG. 6 generates a third interrupt ITRW instead of the first interrupt ITRD.

The trigger object 400 generates the second trigger signal TRGW associated with the DVFS that is performed by the SOC 100 (e.g., that is performed or executed on the target hardware). For example, the second trigger signal TRGW may represent whether a second target event is to be performed (e.g., whether the target hardware is to be used for the second target event). The second trigger signal TRGW may be activated when the second target event is performed, and the second trigger signal TRGW may be deactivated when the second target event is not performed. For example, the second target event may be a memory-bound job, and may be different from the first target event.

The interrupt controller 150 may generate an interrupt, based on the second trigger signal TRGW and an interrupt control signal ITC at each scheduled time. For example, the interrupt controller 150 may generate the third interrupt ITRW in each of a plurality of third cycles when the second trigger signal TRGW is activated, and may generate the second interrupt ITRB in each of the plurality of second cycles when the second trigger signal TRGW is deactivated. The third cycle may be different from the first cycle.

The timer 140 may generate the interrupt control signal ITC in each of the plurality of second cycles, and may be initialized in response to the third interrupt ITRW. For example, whenever the third interrupt ITRW is generated, the timer 140 may be initialized, and then a time counting operation of the timer 140 may begin from the first time. If the third interrupt ITRW is not generated during the second cycle, the time counting operation of the timer 140 may be finished or completed, and then the interrupt control signal ITC may be generated.

Figure 7:
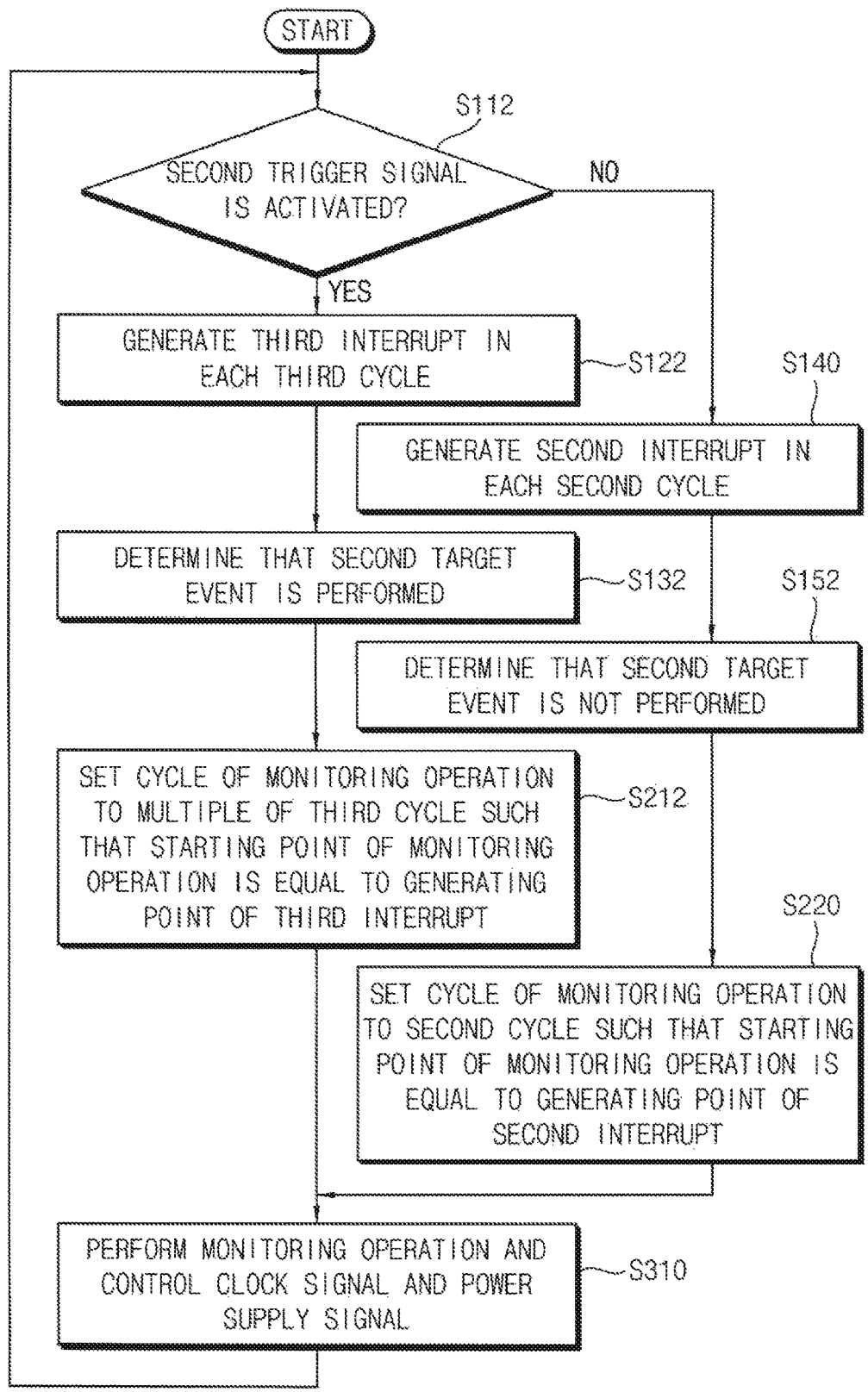
FIG. 7 is a flow chart illustrating a method of operating a SOC, according to example embodiments.
Figure 8:
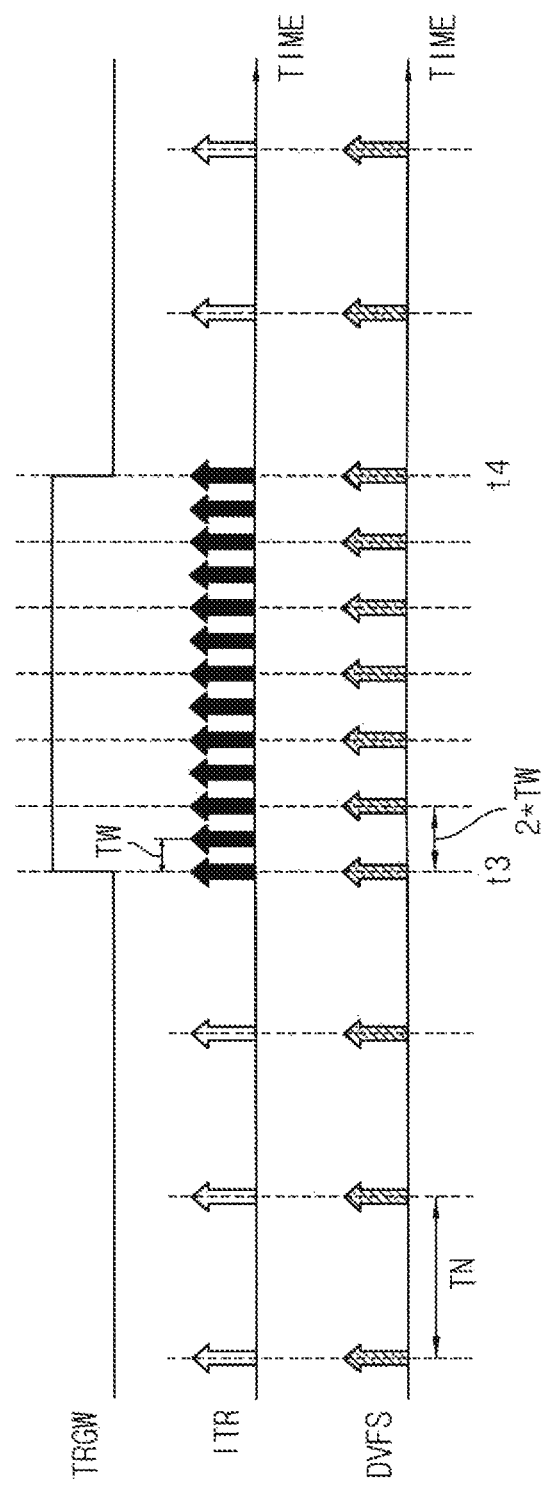
FIGS. 8 and 9 are diagrams for describing the method of operating the SOC of FIG. 7.
Figure 9:
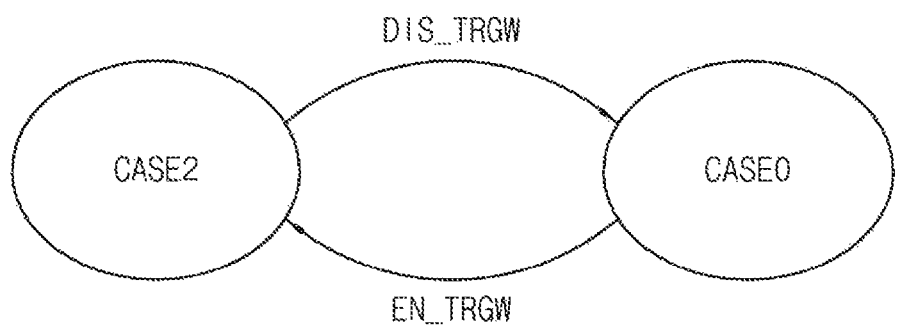

FIG. 7 is a flow chart illustrating a method of operating a SOC, according to example embodiments. FIGS. 8 and 9 are diagrams for describing the method of operating the SOC of FIG. 7.

In FIG. 8, "ITR" represents interrupts (e.g., the second and third interrupts ITRB and ITRW) that are generated by the interrupt controller 150 in FIG. 6. Each of white arrows and each of black arrows on the reference numeral "ITR" represent the second interrupt ITRB and the third interrupt ITRW, respectively. In FIG. 8, "DVFS" represents an operation of performing the DVFS. Each of hatched arrows on the reference numeral "DVFS" represents that the monitoring operation for the target hardware and a control of the clock signal and the power supply signal provided to the target hardware are performed.

Referring to FIGS. 6, 7 and 8, in the method of operating the SOC 100 according to example embodiments, the second trigger signal TRGW representing whether the second target event is to be performed is activated or detected (step S112). For example, the second target event may represent a massive data transferring operation performed by the electronic system 10 including the SOC 100. For example, the massive data transferring operation may be performed in response to a data transaction interrupt in universal serial bus (USB) connecting mode and/or a WIFI connecting mode, and a second unit operation used for the second target event performed by the target hardware may represent a unit data transferring operation performed in response to the data transaction interrupt.

When the second trigger signal TRGW is deactivated (step S112: NO), the second interrupt ITRB is generated in each second cycle TN (step S140). It is determined, based on the second interrupt ITRB, that the second target event is not performed (step S152), and then a cycle of the monitoring operation for the target hardware is set to the second cycle TN such that a starting point of the monitoring operation is substantially equal to a generating point of the second interrupt ITRB (step S220). Based on the set cycle (e.g., based on the second cycle TN), the monitoring operation is performed for the target hardware, and the clock signals CLK1 and CLK2 and the power supply signals PWR1 and PWR2 are controlled or adjusted (step S310).

Steps S140, S152, S220 and S310 in FIG. 7 may be substantially the same as S140, S150, S220 and S310 in FIG. 3, respectively. An operation before time t3 in FIG. 8 may be substantially the same as an operation before time t1 in FIG. 4.

At time t3, the second trigger signal TRGW is activated. When the second trigger signal TRGW is activated (step S112: YES), the third interrupt ITRW is generated in each third cycle TW (step S122). It is determined, based on the third interrupt ITRW, that the second target event is performed (step S132). In other words, it may be determined that the target hardware is used for performing the second target event. For example, the third interrupt ITRW may be the data transaction interrupt. For example, the third cycle TW may be about 4 ms in the WIFI connecting mode.

When the second trigger signal TRGW is activated (step S112: YES), the cycle of the monitoring operation for the target hardware is set to a multiple of the third cycle TW such that the starting point of the monitoring operation is substantially equal to a generating point of the third interrupt ITRW (step S212). In other words, the cycle of the monitoring operation may be set to a fourth cycle that is about N times the third cycle TW, where N is a natural number greater than or equal to two. For example, as illustrated in FIG. 8, N may be two, and the cycle of the monitoring operation may be set to a double of the third cycle TW (e.g., 2*TW). The hatched arrows may be matched with some of the black arrows, and a single hatched arrow may be located corresponding to every two black arrows.

Based on the set cycle (e.g., based on the fourth cycle 2*TW), the monitoring operation is performed for the target hardware, and the clock signals CLK1 and CLK2 and the power supply signals PWR1 and PWR2 are controlled or adjusted (step S310).

Steps S122, S132 and S310 in FIG. 7 may be substantially the same as S120, S130 and S310 in FIG. 3, respectively, and step S212 in FIG. 7 may be similar to step S210 in FIG. 3.

At time t4, the second trigger signal TRGW is deactivated. An operation after time t4 may be substantially the same as an operation before time t3.

Referring to FIGS. 6 and 9, "CASE0" represents a third state during which the second target event is not performed, and "CASE2" represents a fourth state during which the second target event is performed. The third state CASE0 in FIG. 9 may be similar to the first state CASE0 in FIG. 5. When the second trigger signal TRGW is activated (e.g., EN_TRGW), a state of the SOC 100 is changed from the third state CASE0 to the fourth state CASE2. When the second trigger signal TRGW is deactivated (e.g., DIS_TRGW), the state of the SOC 100 is changed from the fourth state CASE2 to the third state CASE0.

Figure 10:
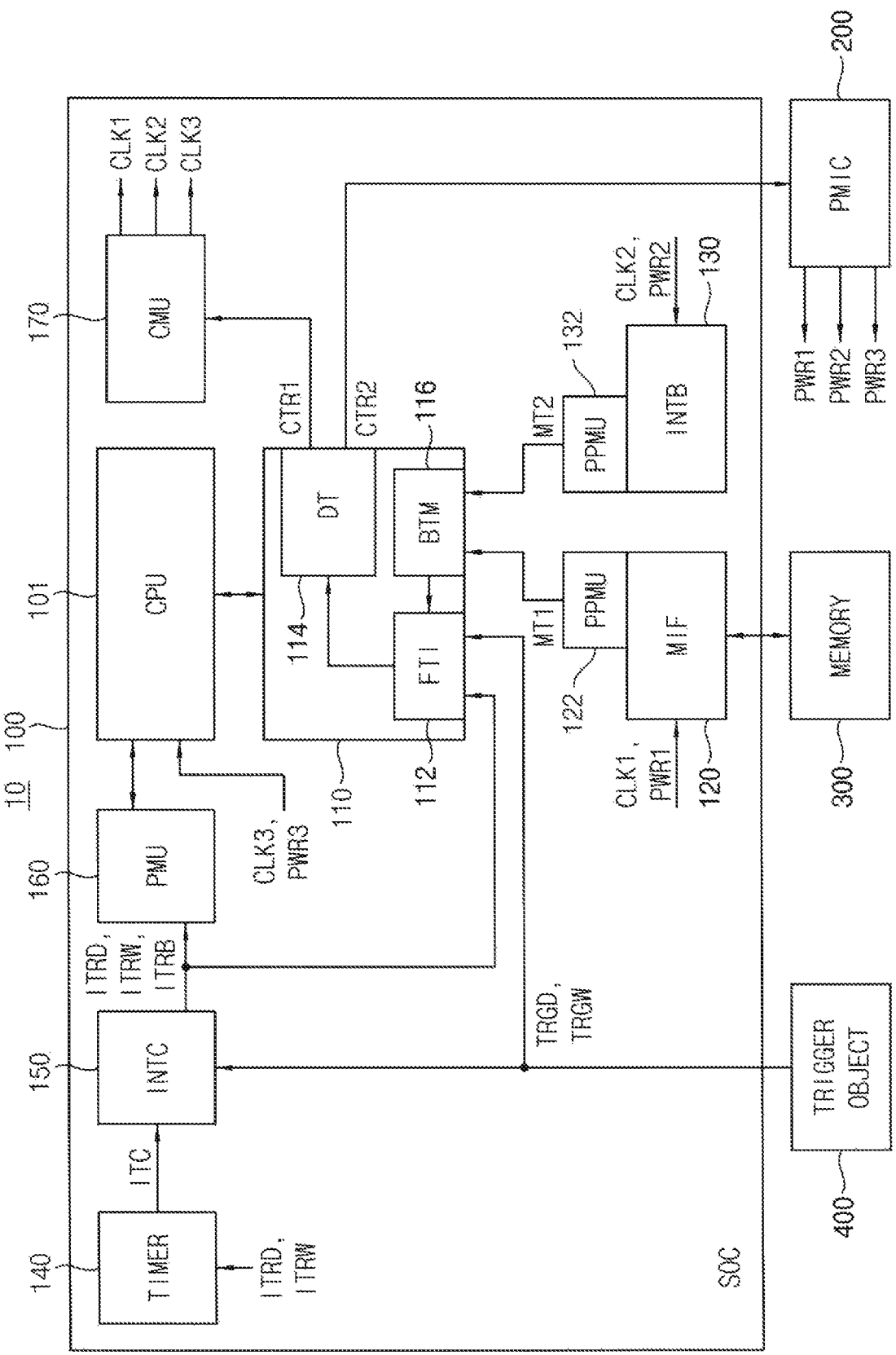
FIG. 10 is a block diagram illustrating an electronic system including a SOC, according to example embodiments.

FIG. 10 is a block diagram illustrating an electronic system including a SOC, according to example embodiments.

Referring to FIG. 10, an electronic system 10 includes a SOC 100, a PMIC 200, a memory device 300 and a trigger object 400. The electronic system 10 in FIG. 10 may be substantially the same as the electronic system 10 in FIG. 2, except that the trigger object 400 in FIG. 10 further generates a second trigger signal TRGW, and the interrupt controller 150 in FIG. 10 further generates a third interrupt ITRW.

The trigger object 400 generates the first and second trigger signals TRGD and TRGW associated with the DVFS that is performed by the SOC 100 (e.g., that is performed or executed on the target hardware). The first and second trigger signals TRGD and TRGW may be substantially the same as the first and second trigger signals TRGD and TRGW described with reference to FIGS. 2 and 6, respectively.

The interrupt controller 150 may generate an interrupt, based on the first and second trigger signals TRGD and TRGW and an interrupt control signal ITC at each scheduled time.

In example embodiments, when at least a portion of the first target event and the second target event overlap each other, e.g., when at least a portion of an activation period of the first trigger signal TRGD and an activation period of the second trigger signal TRGW overlap each other, one of the first and third interrupts ITRD and ITRW may be generated based on a priority of the first and second target events. For example, an interrupt corresponding to a target event having a higher priority may be generated. For example, when at least a portion of the first target event and the second target event overlap each other, and when the second target event has a priority higher than that of the first target event, the third interrupt ITRW corresponding to the second target event may be generated, and a cycle of the monitoring operation for the target hardware may be set based on the third interrupt ITRW such that a starting point of the monitoring operation is substantially equal to a starting point of the second unit operation of the second target event having a higher priority.

The timer 140 may generate the interrupt control signal ITC in each of the plurality of second cycles, and may be initialized in response to the first and third interrupts ITRD and ITRW.

Figure 11:
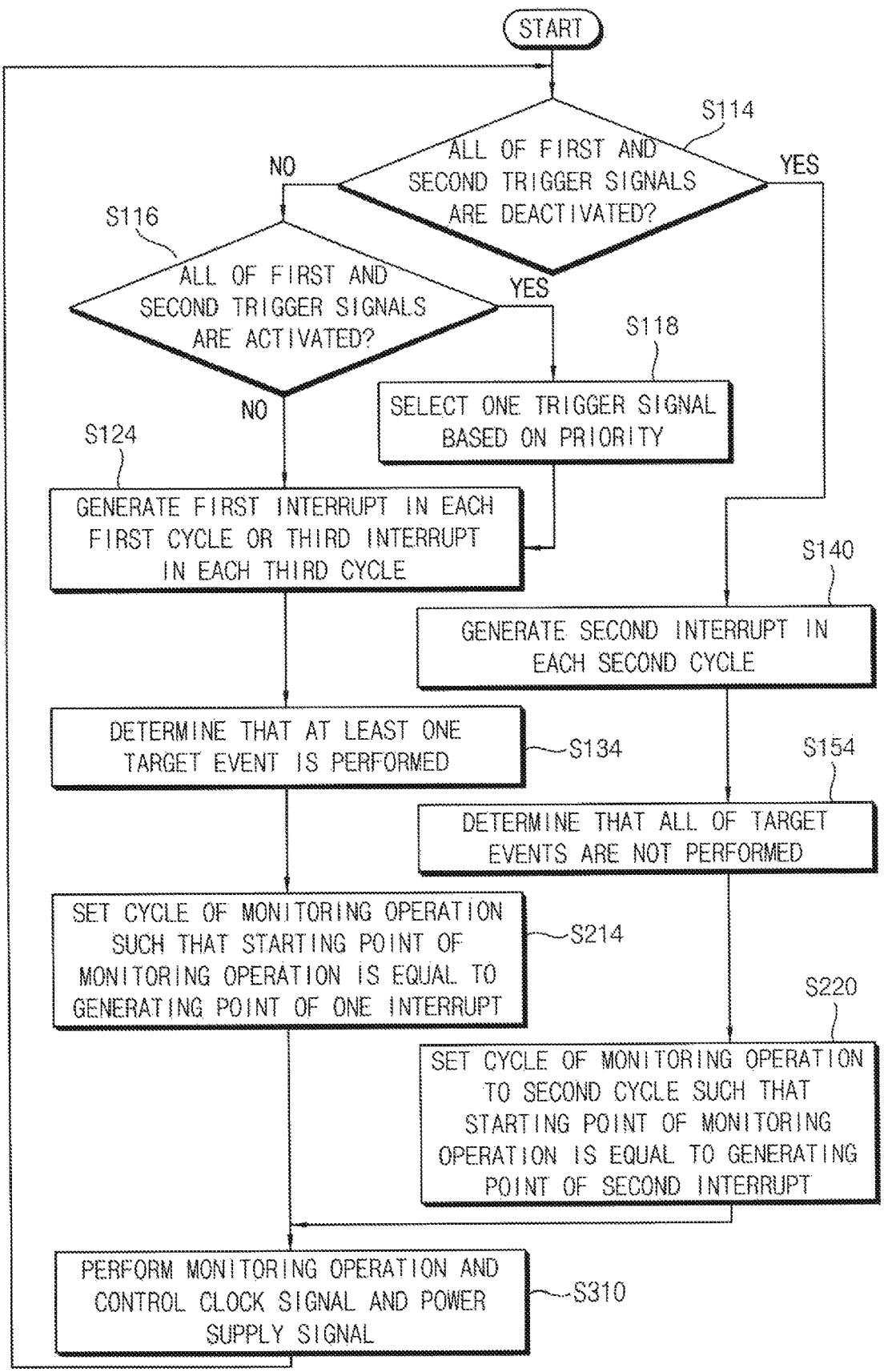
FIG. 11 is a flow chart illustrating a method of operating a SOC, according to example embodiments.
Figure 12:
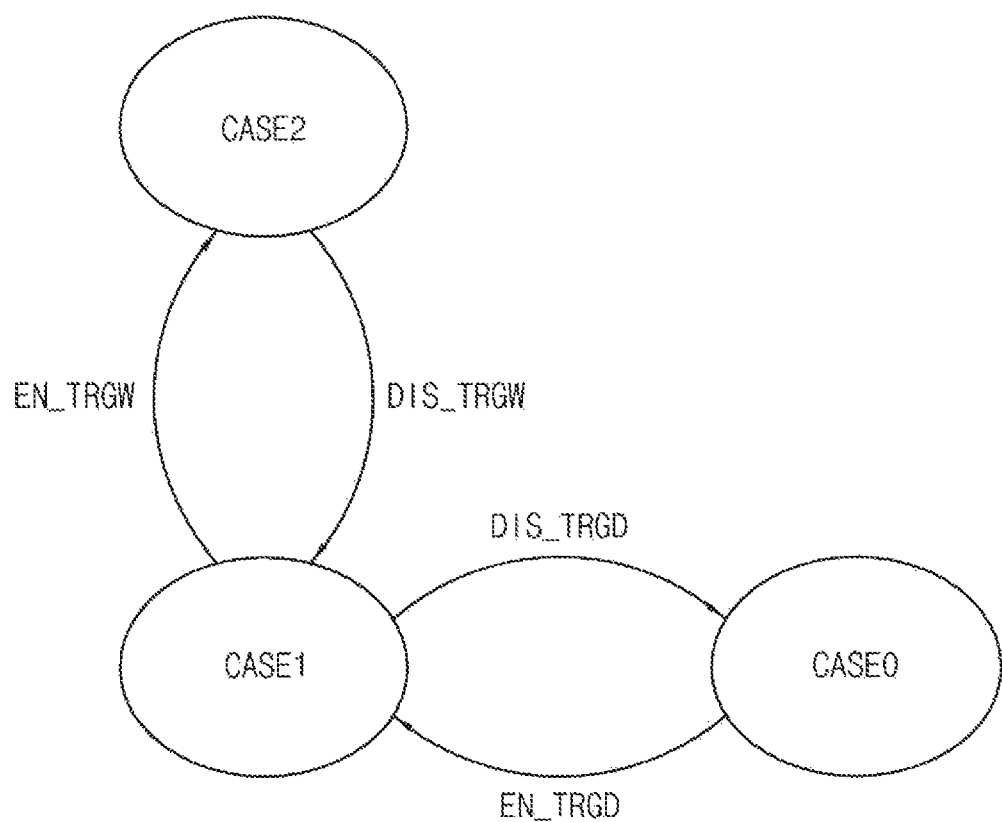
FIG. 12 is a diagram for describing the method of operating the SOC of FIG. 11.

FIG. 11 is a flow chart illustrating a method of operating a SOC, according to example embodiments. FIG. 12 is a diagram for describing the method of operating the SOC of FIG. 11.

Referring to FIGS. 11 and 12, in the method of operating the SOC 100 according to example embodiments, the first trigger signal TRGD representing whether the first target event is to be performed and the second trigger signal TRGW representing whether the second target event is to be performed may be detected.

When all of the first and second trigger signals TRGD and TRGW are deactivated (step S114: YES), the second interrupt ITRB is generated in each second cycle TN (step S140). It is determined, based on the second interrupt ITRB, that all of the first and second target events are not performed (step S154), and then a cycle of the monitoring operation for the target hardware is set to the second cycle TN such that a starting point of the monitoring operation is substantially equal to a generating point of the second interrupt ITRB (step S220). Based on the set cycle (e.g., based on the second cycle TN), the monitoring operation is performed for the target hardware, and the clock signals CLK1 and CLK2 and the power supply signals PWR1 and PWR2 are controlled or adjusted (step S310). Such operation described above may be substantially the same as an operation before time t1 in FIG. 4 or an operation before time t3 in FIG. 8.

Steps S140, S154, S220 and S310 in FIG. 11 may be substantially the same as S140, S150, S220 and S310 in FIG. 3, respectively.

When all of the first and second trigger signals TRGD and TRGW are activated (step S114: NO and step S116: YES), one trigger signal and/or one target event may be selected based on a priority of the first and second target events (step S118). For example, a target event having a higher priority and/or a trigger signal corresponding to the target event having a higher priority may be selected. For example, step S118 may be performed by the interrupt controller 150 and/or the DVFS controller 110. Based on the selected trigger signal, the first interrupt ITRD may be generated in each first cycle TD or the third interrupt ITRW may be generated in each third cycle TW (step S124).

When only one of the first and second trigger signals TRGD and TRGW is activated (step S114: NO and step S116: NO), the first interrupt ITRD may be generated in each first cycle TD or the third interrupt ITRW may be generated in each third cycle TW, based on the activated trigger signal (step S124).

When either one or both of the first and second trigger signals TRGD and TRGW is activated (step S114: NO), it is determined, based on the interrupt generated by step S124 and the activation of the first and second trigger signals TRGD and TRGW, that at least one of the first and second target events is performed (step S134). The cycle of the monitoring operation for the target hardware is set such that the starting point of the monitoring operation is substantially equal to a generating point of the interrupt generated by step S124 (step S214). Based on the cycle set by step S214, the monitoring operation is performed for the target hardware, and the clock signals CLK1 and CLK2 and the power supply signals PWR1 and PWR2 are controlled or adjusted (step S310). Such operation described above may be substantially the same as an operation between time t1 and time t2 in FIG. 4 or an operation between time t3 and time t4 in FIG. 8.

Steps S124, S134 and S310 in FIG. 11 may be substantially the same as S120, S130 and S310 in FIG. 3, respectively, and step S214 in FIG. 11 may be substantially the same as step S210 in FIG. 3 or step S212 in FIG. 7.

Referring to FIGS. 10 and 12, "CASE1" represents a first state during which the first target event is performed, "CASE0" represents a second state during which all of the first and second target events are not performed, and "CASE2" represents a third state during which the second target event is performed.

When the first and second target events are substantially simultaneously or concurrently performed, a state of the SOC 100 may be changed to the third state CASE2 because the second target event has a priority higher than that of the first target event. The cycle of the monitoring operation for the target hardware may be set such that the starting point of the monitoring operation is substantially equal the a starting point of the second unit operation of the second target event having a higher priority.

A state change between the first state CASE1 and the second state CASE0 may be substantially the same as a state change between the first state CASE1 and the second state CASE0 described with reference to FIG. 5. A state change between the second state CASE0 and the third state CASE2 may be substantially the same as a state change between the third state CASE0 and the fourth state CASE2 described with reference to FIG. 9.

Figure 13:
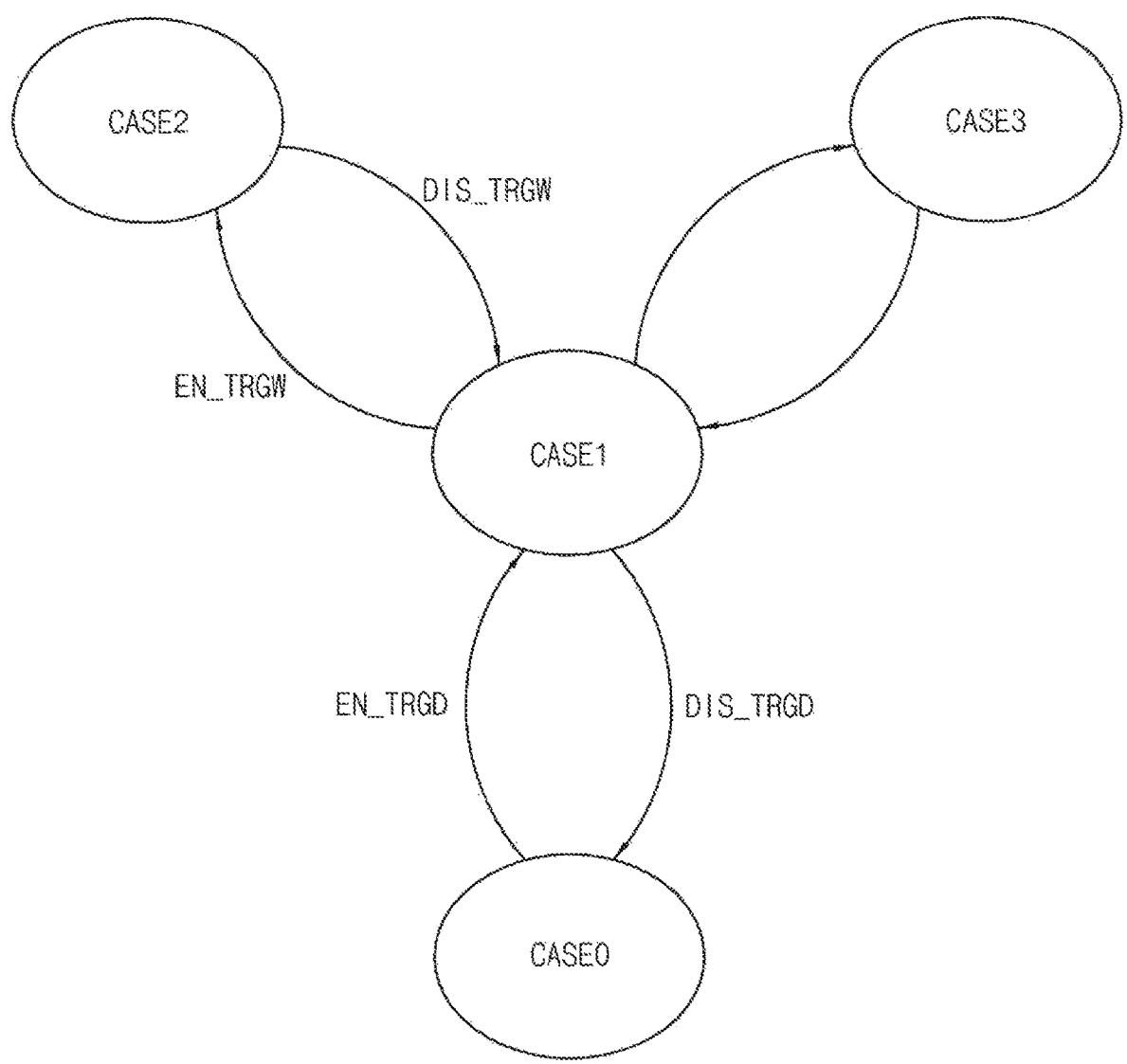
FIGS. 13 and 14 are diagrams for describing a method of operating a SOC, according to example embodiments.
Figure 14:
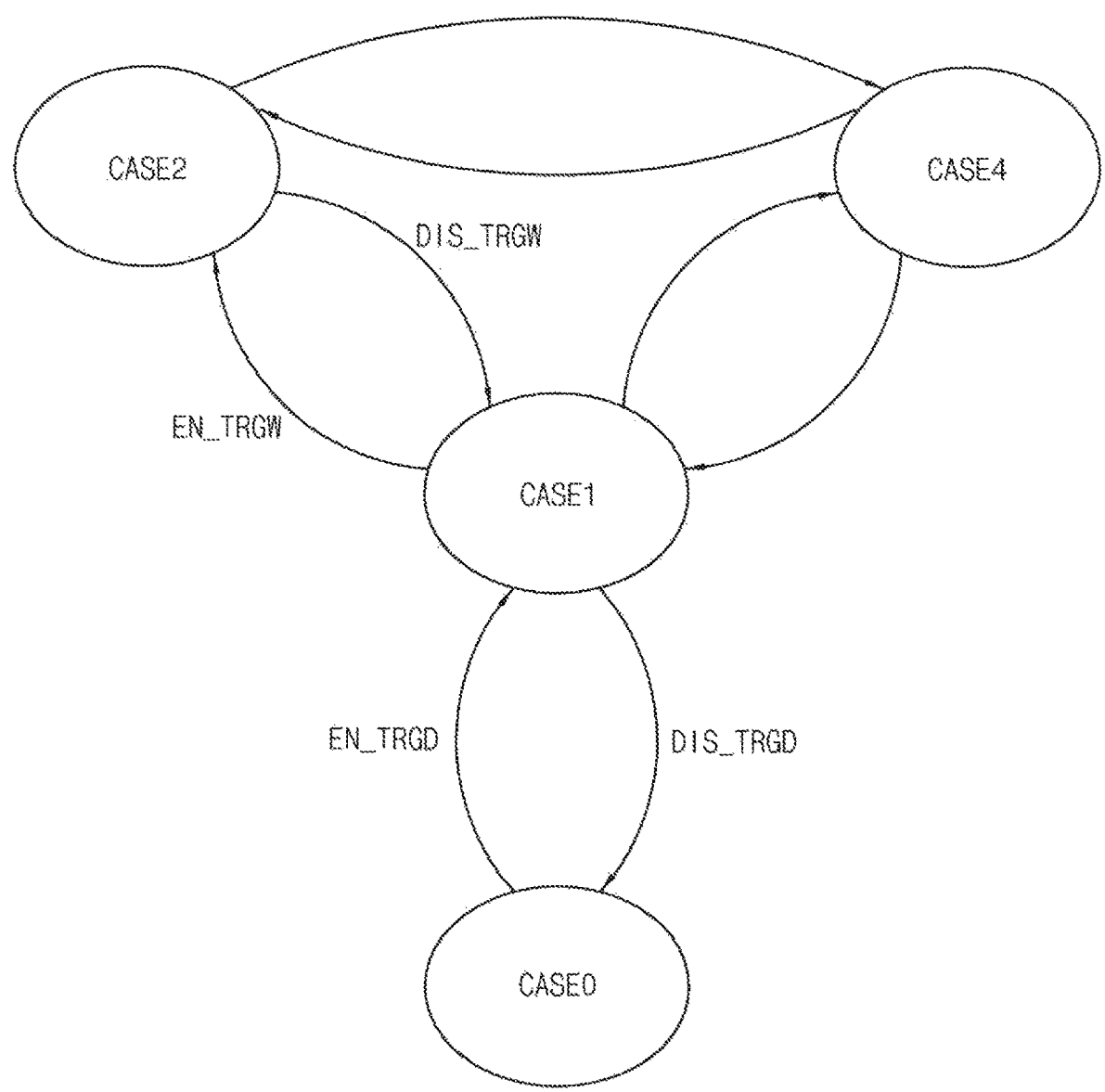

FIGS. 13 and 14 are diagrams for describing a method of operating a SOC, according to example embodiments.

In FIGS. 13 and 14, a first state CASE1, a second state CASE0 and a third state CASE2 may be substantially the same as the first state CASE1, the second state CASE0 and the third state CASE2 in FIG. 12, respectively.

Referring to FIG. 13, "CASE3" represents a fourth state during which a third target event is performed. For example, the third target event may be a memory-bound job, and may be different from the first and second target events.

In an example of FIG. 13, when the first and third target events are substantially simultaneously or concurrently performed, a state of the SOC 100 may be changed to the fourth state CASE3 because the third target event has a priority higher than that of the first target event. However, a priority between the second and third target events may not be predetermined in FIG. 13.

Referring to FIG. 14, "CASE4" represents a fifth state during which a fourth target event is performed. For example, the fourth target event may be a memory-bound job, and may be different from the first and second target events.

In an example of FIG. 14, when the first and fourth target events are substantially simultaneously or concurrently performed, a state of the SOC 100 may be changed to the fifth state CASE4 because the fourth target event has a priority higher than that of the first target event. In addition, when the first, second and fourth target events are substantially simultaneously or concurrently performed, the state of the SOC 100 may be changed to the fifth state CASE4 because the fourth target event has a priority higher than that of the second target event.

Although the DVFSs for the non-CPU IP are described based on examples in which types and numbers of the memory-bound jobs are performed, the DVFSs for the non-CPU IP according to example embodiments may be applied or employed to any example in which any types and any number of memory-bound jobs are performed.

Figure 15:
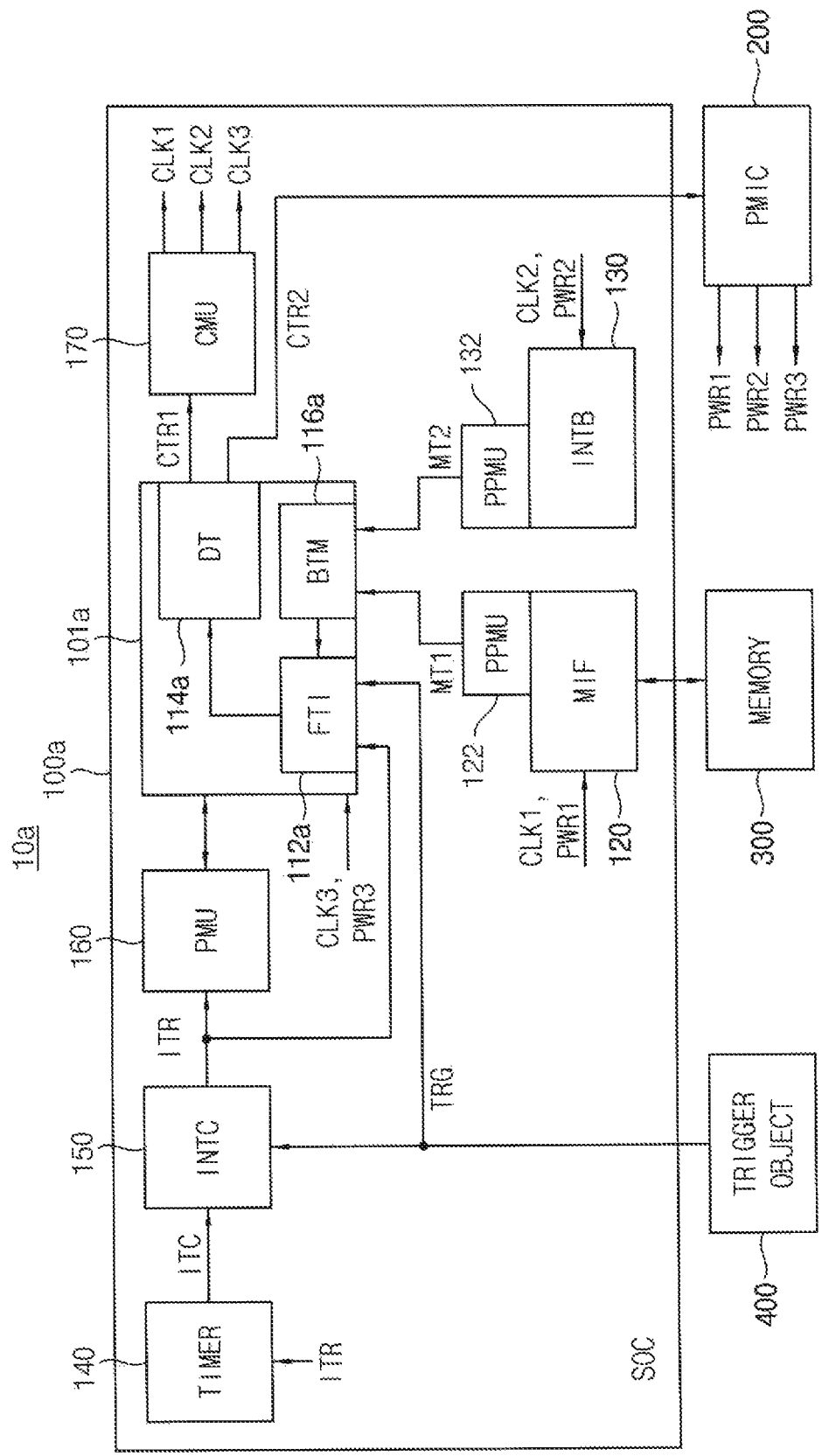
FIGS. 15 and 16 are diagrams illustrating an electronic system including a SOC, according to example embodiments.
Figure 16:
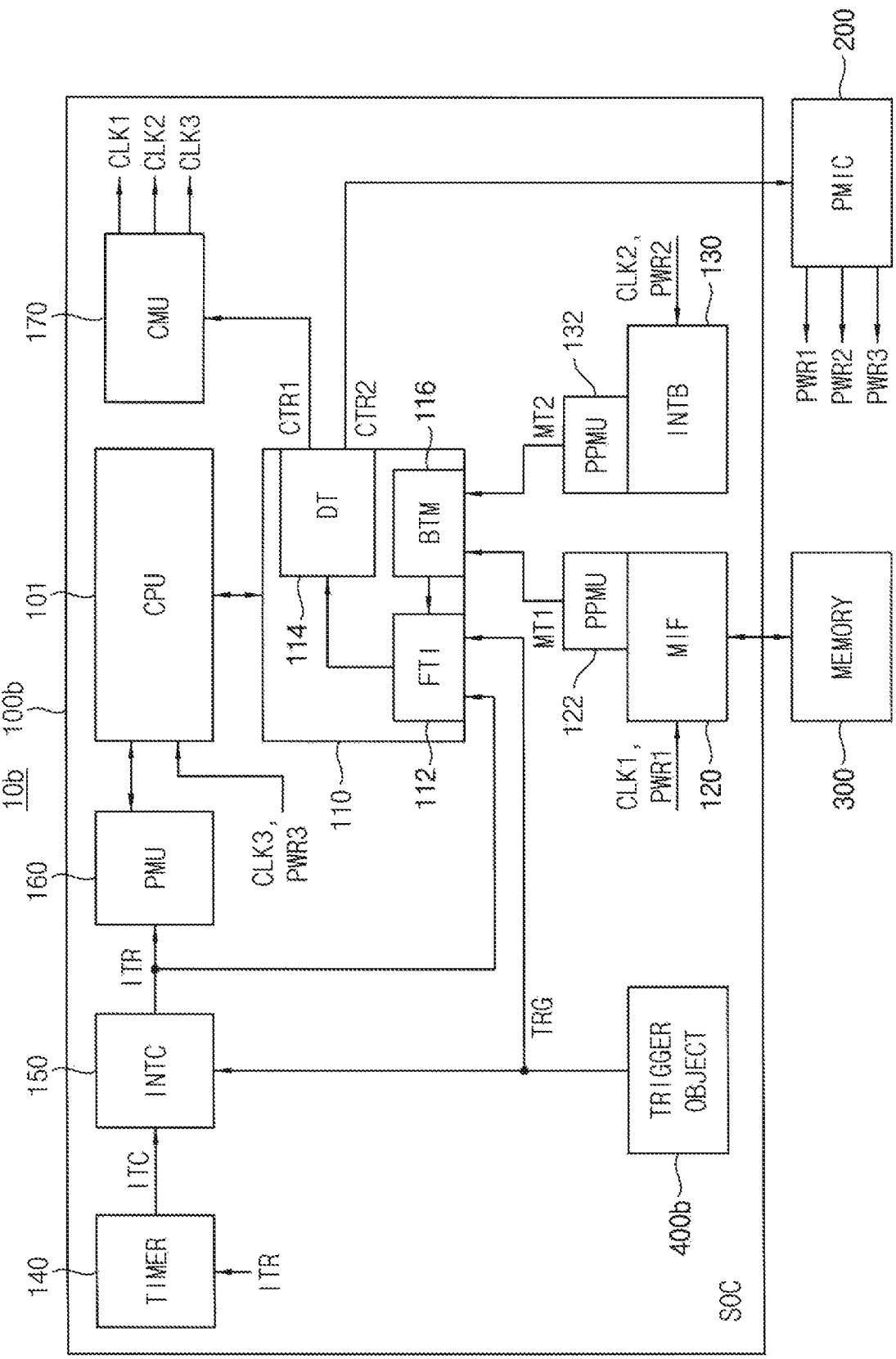

FIGS. 15 and 16 are diagrams illustrating an electronic system including a SOC, according to example embodiments.

Referring to FIG. 15, an electronic system 10a includes a SOC 100a, a PMIC 200, a memory device 300 and a trigger object 400.

The SOC 100a includes a CPU 101a, a memory interface 120, an internal logic 130 with a bus, and a CMU 170. The SOC 100a may further include a first PPMU 122, a second PPMU 132, a timer 140, an interrupt controller 150 and a PMU 160.

In an example of FIG. 15, the DVFS controller 110 in FIG. 2 may be included in the CPU 101a. For example, the CPU 101a may include a focused target identifier 112a, a DVFS trigger unit 114a and a bus traffic monitoring unit 116a. The focused target identifier 112a, the DVFS trigger unit 114a and the bus traffic monitoring unit 116a in FIG. 15 may be substantially the same as the focused target identifier 112, the DVFS trigger unit 114 and the bus traffic monitoring unit 116 in FIG. 2, respectively. The focused target identifier 112a may determine the operating scheme of the target hardware, based on at least one trigger signal TRGD generated from the trigger object 400, or based on at least one interrupt ITR generated from the interrupt controller 150.

Referring to FIG. 16, an electronic system 10b includes a SOC 100b, a PMIC 200 and a memory device 300.

The SOC 100b includes a CPU 101, a DVFS controller 110, a memory interface 120, an internal logic 130 with a bus, and a CMU 170. The SOC 100b may further include a first PPMU 122, a second PPMU 132, a timer 140, an interrupt controller 150, a PMU 160 and a trigger object 400b.

In an example of FIG. 16, the SOC 100b may further include the trigger object 400b. In other words, the trigger object 400b may be located inside the SOC 100b. For example, the trigger object 400b in FIG. 16 may be substantially the same as the trigger object 400 in FIG. 2.

The SOC 100a may include a trigger object 400 that is located inside the SOC 100a, as illustrated in FIG. 16.

The SOC according to example embodiments may further include various functional blocks and/or functional modules. For example, the functional blocks may include a display control block, a file system block, a multi-format codec (MFC) block, a communication control block (e.g., code division multiple access (CDMA), long term evolution (LTE), radio frequency (RF), ultra wideband (UWB), wireless local area network (WLAN), worldwide interoperability for microwave access (WIMAX), etc.), a camera control block (e.g., CMOS image sensor (CIS), etc.), a touch screen panel (TSP) control block, a global positioning system (GPS) control block, a microphone control block, a speaker control block, a gyroscope control block, etc.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 17:
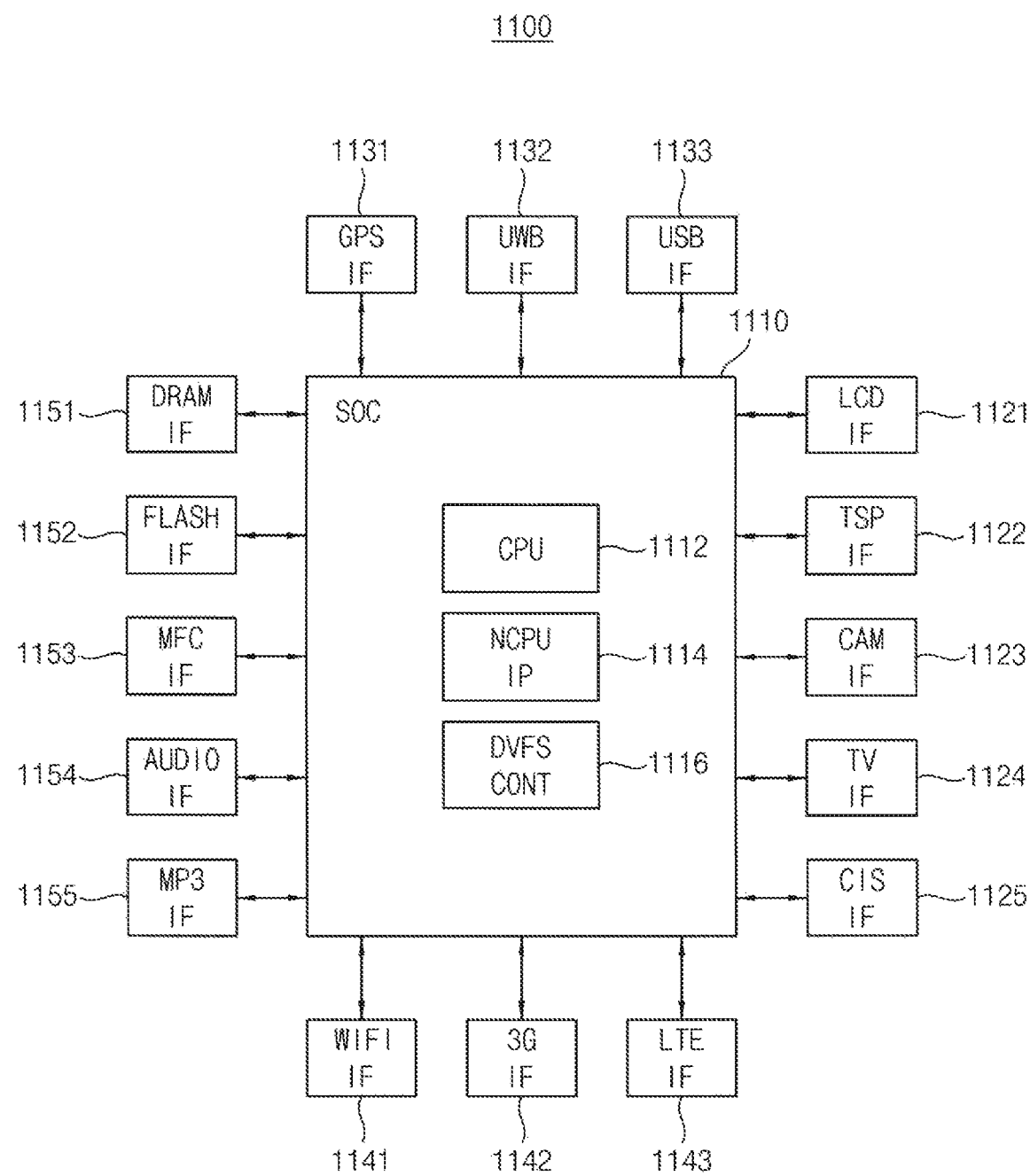
FIG. 17 is a block diagram illustrating an interface included in an electronic system, according to example embodiments.

FIG. 17 is a block diagram illustrating an interface included in an electronic system, according to example embodiments.

Referring to FIG. 17, an electronic system 1100 may include a SOC 1110 and a plurality of interfaces 1121, 1122, 1123, 1124, 1225, 1131, 1132, 1133, 1141, 1142, 1143, 1151, 1152, 1153, 1154 and 1155.

The SOC 1110 may control overall operations of the electronic system 1100, and may include a CPU 1112, a non-CPU IP (NCPU IP) 1114 and a DVFS controller (DVFS CONT) 1116 according to example embodiments.

The SOC 1110 may control operation states of a display device (e.g., a liquid crystal display (LCD)), a TSP, a camcorder, a TV module and a camera module (or an image sensor module) via a display (LCD) interface (IF) 1121, a TSP interface 1122, a camcorder (CAM) interface 1123, a TV interface 1124 and an image sensor (CIS) interface 1125, respectively. The SOC 1110 may control operation states of a GPS module, a UWB module and a USB module via a GPS interface 1131, a UWB interface 1132 and a USB interface 1133. The SOC 1110 may control operation states of a WIFI module, a 3G module and an LTE module via a WIFI interface 1141, a 3G interface 1142 and an LTE interface 1143. The SOC 1110 may control operation states of a DRAM, a flash memory, an MFC module, an audio module and an MP3 module via a DRAM interface 1151, a flash interface 1152, an MFC interface 1153, an audio interface 1154 and an MP3 interface 1155. Here, a module and/or an interface may be implemented as hardware or software program.

The present disclosure may be used in various kinds of SOCs or a system including the SOCs, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, a wearable device, an IoT device, an IoE device, an e-book, a VR device, an AR device, a robotic device, etc.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The foregoing is illustrative of the example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of the example embodiments and is not to be construed as limited to the example embodiments disclosed, and that modifications to the disclosed example embodiments, as well as other example embodiments, are intended to be included within the scope of the appended claims.

What is claimed is:

1. A method of operating a system-on-chip (SOC) comprising a central processing unit (CPU) and a target hardware to which a dynamic voltage and frequency scaling (DVFS) is applied, the method comprising:
    determining an operating scheme of the target hardware, the operating scheme comprising a first unit operation for a first target event that is performed by the target hardware, and the determining the operating scheme comprising:

detecting a first trigger signal representing whether the first target event is to be performed;
generating a first interrupt in each of first cycles in response to the first trigger signal being activated; and
determining, based on the first interrupt, that the target hardware is used to perform the first target event;
setting a DVFS application scheme for applying the DVFS to the target hardware, based on the operating scheme of the target hardware, the DVFS application scheme comprising a starting point of a monitoring operation for the target hardware, and the setting the DVFS application scheme comprising, in response to the first trigger signal being activated, setting a cycle of the monitoring operation to one of the first cycles such that the starting point of the monitoring operation is substantially equal to a generating point of the first interrupt; and
performing the DVFS on the target hardware, based on the DVFS application scheme.

2. The method of claim 1, wherein the starting point of the monitoring operation for the target hardware is matched with a starting point of the first unit operation.

3. The method of claim 1, wherein the performing the DVFS further comprises:
performing, by the target hardware, the first unit operation in each of the first cycles; and
controlling a clock signal and a power supply signal that are provided to the target hardware in each of the first cycles.

4. The method of claim 1, wherein the determining the operating scheme of the target hardware further comprises:
generating a second interrupt in each of second cycles in response to the first trigger signal being deactivated; and
determining, based on the second interrupt, that the first target event is not performed.

5. The method of claim 4, wherein the setting the DVFS application scheme further comprises, in response to the first trigger signal being deactivated, setting the cycle of the monitoring operation to one of the second cycles such that the starting point of the monitoring operation is substantially equal to a generating point of the second interrupt, and
wherein the performing the DVFS further comprises controlling a clock signal and a power supply signal that are provided to the target hardware in each of the second cycles.

6. The method of claim 4, wherein each of the second cycles is longer than one of the first cycles.

7. The method of claim 1, wherein the setting the DVFS application scheme further comprises, in response to the first trigger signal being activated, setting the cycle of the monitoring operation to one of second cycles such that the starting point of the monitoring operation is substantially equal to the generating point of the first interrupt, each of the second cycles being about N times one of the first cycles, where N is a natural number greater than or equal to two, and
wherein the performing the DVFS further comprises controlling a clock signal and a power supply signal that are provided to the target hardware in each of the second cycles.

8. The method of claim 1, wherein the target hardware comprises a memory interface and an internal logic with a bus, and
wherein the first target event represents a screen updating operation that is performed by an electronic system comprising the SOC.

9. The method of claim 1, wherein the target hardware comprises a memory interface and an internal logic with a bus, and
wherein the first target event represents a massive data transferring operation that is performed by an electronic system comprising the SOC.

10. The method of claim 1, wherein the operating scheme of the target hardware further comprises a second unit operation for a second target event that is performed by the target hardware.

11. The method of claim 10, wherein the starting point of the monitoring operation for the target hardware is matched with one of a starting point of the first unit operation and a starting point of the second unit operation.

12. The method of claim 11, wherein the determining the operating scheme of the target hardware further comprises detecting a second trigger signal representing whether the second target event is to be performed, and
wherein the setting the DVFS application scheme further comprises, in response to the first trigger signal and the second trigger signal being activated, set the cycle of the monitoring operation such that the starting point of the monitoring operation is substantially equal to a starting point of a unit operation for a target event having a higher priority among the first target event and the second target event.

13. A system-on-chip (SOC) comprising:
a target hardware to which a dynamic voltage and frequency scaling (DVFS) is applied;
a DVFS controller configured to determine an operating scheme of the target hardware, the operating scheme comprising a first unit operation for a first target event that is performed by the target hardware;
an interrupt controller configured to:
detect a first trigger signal representing whether the first target event is to be performed; and
generate a first interrupt in each of first cycles in response to the first trigger signal being activated,
wherein the DVFS controller is further configured to
determine, based on the first interrupt, that the target hardware is used to perform the first target event;
set a DVFS application scheme for applying the DVFS to the target hardware, based on the operating scheme of the target hardware, the DVFS application scheme comprising a starting point of a monitoring operation for the target hardware;
in response to the first trigger signal being activated, set a cycle of the monitoring operation to one of the first cycles such that the starting point of the monitoring operation is substantially equal to a generating point of the first interrupt; and
generate a first control signal and a second control signal that are used to perform the DVFS on the target hardware, based on the DVFS application scheme;
a central processing unit (CPU) configured to control the target hardware and the DVFS controller; and
a clock management unit (CMU) configured to generate a clock signal, based on the first control signal, and provide the clock signal to the target hardware.

14. The SOC of claim 13, wherein an external power management integrated circuit (PMIC) generates a power supply signal, based on the second control signal, and provides the power supply signal to the target hardware.

15. A system-on-chip (SOC) comprising:
a target hardware to which a dynamic voltage and frequency scaling (DVFS) is applied;

a DVFS controller configured to:
- detect a trigger signal representing whether a target event is to be performed by the target hardware;
- in response to the trigger signal being activated, set a cycle of a monitoring operation for the target hardware to one of first cycles, and set a starting point of the monitoring operation to be substantially equal to a starting point at which the trigger signal is activated; and
- generate a control signal that is used to perform the monitoring operation, based on the cycle and the starting point of the monitoring operation;

a clock management unit (CMU) configured to generate a clock signal, based on the control signal, and provide the clock signal to the target hardware; and an interrupt controller configured to, in response to the trigger signal being deactivated, generate an interrupt in each of second cycles that is longer than one of the first cycles, wherein the DVFS controller is further configured to, in response to the trigger signal being deactivated, set the cycle of the monitoring operation for the target hardware to one of the second cycles, and set the starting point of the monitoring operation to be substantially equal to a generating point at which the interrupt is generated.

16. The SOC of claim 15, wherein the interrupt controllers is further configured to, in response to the trigger signal being activated, generate the interrupt in each of the first cycles.

* * * * *